United States Patent
Mixson, Sr.

(10) Patent No.: US 12,333,964 B1
(45) Date of Patent: Jun. 17, 2025

(54) VEHICLE MIRROR MOUNTED FLAG

(71) Applicant: Paul Richard Mixson, Sr., Pace, FL (US)

(72) Inventor: Paul Richard Mixson, Sr., Pace, FL (US)

( * ) Notice: Subject to any disclaimer, the term of this patent is extended or adjusted under 35 U.S.C. 154(b) by 364 days.

(21) Appl. No.: 17/953,607

(22) Filed: Sep. 27, 2022

(51) Int. Cl.
*G09F 17/00* (2006.01)
*B60R 11/00* (2006.01)

(52) U.S. Cl.
CPC .............. *G09F 17/00* (2013.01); *B60R 11/00* (2013.01); *B60R 2011/004* (2013.01); *B60R 2011/0059* (2013.01); *G09F 2017/0075* (2013.01)

(58) Field of Classification Search
CPC . G09F 17/00; G09F 2017/0075; B60R 11/00; B60R 2011/004; B60R 2011/0059
See application file for complete search history.

(56) References Cited

U.S. PATENT DOCUMENTS

| | | | |
|---|---|---|---|
| 1,202,493 A | 10/1916 | Dollenberg | |
| 1,453,911 A | 5/1923 | Browne | |
| 2,398,748 A | 4/1946 | Lange et al. | |
| 2,445,606 A | 7/1948 | Davis | |
| 2,534,117 A | 12/1950 | Flick | |
| 2,764,122 A | 9/1956 | Irvin | |
| 2,922,152 A | 1/1960 | Conte | |
| 3,158,132 A | 11/1964 | Guthrie | |
| 3,239,957 A | 3/1966 | Snediker | |
| 3,305,961 A | 2/1967 | Lanzon et al. | |
| 3,493,203 A | 2/1970 | Gualano | |
| 3,672,323 A | 6/1972 | Hawes | |
| 3,715,821 A | 2/1973 | Hawes | |
| 3,762,360 A | 10/1973 | Hawes | |
| 4,002,138 A | 1/1977 | Dobala | |
| 4,986,209 A | 1/1991 | Spica | |
| 5,048,451 A * | 9/1991 | Reimers | B60Q 1/486 |
| | | | 116/35 R |
| 5,233,938 A | 8/1993 | Lalo | |
| 5,740,622 A | 4/1998 | Martin | |
| D411,484 S | 6/1999 | Hill | |
| 6,278,408 B1 | 8/2001 | Segovia, Jr. | |
| 6,467,918 B2 * | 10/2002 | Strode | B60R 1/12 |
| | | | 359/872 |
| 6,557,483 B2 | 5/2003 | Nathan | |
| 6,609,476 B1 | 8/2003 | Lorenzana et al. | |
| 6,748,683 B1 | 6/2004 | Schultz | |

(Continued)

*Primary Examiner* — Kristina M Deherrera
*Assistant Examiner* — Tania Courson
(74) *Attorney, Agent, or Firm* — Peter Loffler

(57) ABSTRACT

A flag system removably attaches to a rearview mirror of a vehicle. The system uses a pair of clips that each hook, via a hook portion, to a rearward facing edge of the mirror housing, one clip hooked to the upper edge of the housing, the other clip hooked to the lower edge of the housing. A flag extends upwardly from the upper clip. A strap connects the two clips and passes along the forward-facing outer surface of the mirror housing. The strap is pulled taut and secured in the taut position, thereby securing the flag system to the mirror housing. The flag may be secured to a post which is attached to the upper clip. Strap sizing can be achieved using a pair of cooperating hook and loop sections, one section at an end of the strap, the other section located medially along the strap.

14 Claims, 4 Drawing Sheets

(56) References Cited

U.S. PATENT DOCUMENTS

| | | | |
|---|---|---|---|
| 6,941,690 B2* | 9/2005 | McCambley, Jr. | B60R 13/00 |
| | | | 40/591 |
| 7,066,105 B2* | 6/2006 | Tal | G09F 21/04 |
| | | | 116/28 R |
| 7,372,416 B1 | 5/2008 | Marchessault et al. | |
| 7,628,498 B1* | 12/2009 | Huang | B60R 1/078 |
| | | | 359/872 |
| 7,866,835 B2* | 1/2011 | Liu | B60R 1/078 |
| | | | 248/475.1 |
| 7,987,808 B1 | 8/2011 | Evans | |
| 7,992,333 B1* | 8/2011 | McGuinness | G09F 21/048 |
| | | | 116/28 R |
| 8,915,208 B2 | 12/2014 | Shanahan | |
| 9,010,000 B1 | 4/2015 | Rodriguez | |
| 9,159,254 B2 | 10/2015 | Oyoung | |
| 2003/0000044 A1 | 1/2003 | Hawkins | |
| 2003/0094473 A1 | 5/2003 | Moore | |
| 2003/0145777 A1 | 8/2003 | Lorenzana et al. | |
| 2004/0200107 A1 | 10/2004 | Lehman | |
| 2004/0218295 A1* | 11/2004 | Chen | B60R 1/078 |
| | | | 359/879 |
| 2005/0028722 A1* | 2/2005 | Arntz | G09F 17/00 |
| | | | 116/173 |
| 2005/0108909 A1 | 5/2005 | Andersen | |
| 2007/0019312 A1* | 1/2007 | Hu | B60R 1/078 |
| | | | 296/1.11 |
| 2011/0131850 A1 | 6/2011 | Wiebe | |
| 2012/0154911 A1 | 6/2012 | Huynh et al. | |
| 2018/0061286 A1 | 3/2018 | Gogatz et al. | |
| 2018/0090038 A1 | 3/2018 | Kesler | |
| 2020/0388199 A1 | 12/2020 | Hammerle | |

* cited by examiner

VEHICLE MIRROR MOUNTED FLAG

BACKGROUND OF THE INVENTION

1. Field of the Invention

The present invention relates to a flag that is removably attached to an external rearview mirror of a vehicle.

2. Background of the Prior Art

Many vehicle owners like to adorn their vehicle with aftermarket decorations. Such decorations typically are meant to convey some message that the vehicle owner desires to communicate and can run the gamut of messages such as political messages, patriotic messages including recognition of military service, religious messages, humorous messages, seasonal messages, such as "Merry Christmas," school spirit, and support for a sports team among others. Vehicle messaging typically comes in either long term messaging or short-term messaging. Long term messaging is a message that is designed to remain on the vehicle for an indefinite amount of time and typically involves the adherence of a sticker onto a body panel or a window of the vehicle. As the sticker is adhered to the vehicle via a relatively long-term adhesive that makes removal of the sticker fairly cumbersome, the message stays with the vehicle for an extended period of time. Some vehicle owners take such long-term messaging to the extreme and paint the body of the vehicle with the desired message.

Short term messaging is a type of message that is affixed to the vehicle for a relatively short time and is easily removable. Typical of such short-term messages include door magnets and flags, the term flags including banners and pennants. Such messages are placed on the vehicle for a short duration and thereafter removed and stored until needed again. For example, many divers place their favorite team's colors onto their vehicle and fly the colors on game day. After the contest, the colors are removed and stored.

Flags are often the messaging medium of choice for short term message display on a vehicle. Flags are relatively simple devices and are inexpensive to obtain and fly proudly as the vehicle is driven down the street. Various vehicle attachment systems have been proposed for short term flag attachment to a vehicle. Systems exist for attachment of a flag to the bumper, to a trailer hitch, to the hood or trunk lid, to the roof, to the windshield in the case of a convertible, to a door window, and to the interior rearview mirror, among other systems. Quite popular among these systems is the side window mounted flags as such systems are relatively simple, easy to install, and are easily seen by others. In such systems, the flag has a base with an attachment clip that hooks onto an upper edge of a partially lowered side window. Once the base is hooked onto the edge of the window, the window is raised until nearly closed, thereby pressing the base of the flag system into the upper part of the window frame, thereby holding the flag system in place. The window is "tightened" in its raised position so as to have a strong press of the base of the flag system between the upper edge of the window and the window frame so as to hold the flag system firm and upright even as the vehicle travels at highway speeds.

These window systems, which come in varying architectures, are relatively simple and straightforward in design and operation. However, they suffer from certain drawbacks. One problem with such systems lies in the fact that due to the thickness of the clip of the flag system, the window whereat the flag system is installed does not close and seal all the way. This creates a small gap into the window which greatly increases the noise within the vehicle, often resulting in a whistling sound at certain speeds. Additionally, should it start raining, the rain can enter the vehicle's interior through the gap. Additionally, if the flag system is retained in place within the window and frame for a sufficiently long time, such as the time the driver installs the flag system, drivers to the game, attends the game, and drivers back, the base may cause a permanent or semi-permanent depression in the portion of the seal whereat the base was pressing onto the window frame. Such a depression can result in an imperfect seal of the window when the flag system is removed, again resulting in increased noise while driving and the possibility of moisture entering the interior of the vehicle. Yet another problem, one that is encountered by many users of such flag systems occurs at toll booths, dive-thru windows, and the like, when the driver, forgetting about the flag, lowers the window to conduct needed business, and the flag system, now not being press fit into the window frame, falls free. If this occurs in a low-speed environment, such as at a favorite fast-food restaurant, the flag is retrieved, however, if the flag system falls free at higher speeds, it's time to get a new flag system.

What is needed is a vehicle attached flag that overcomes the above stated shortcomings in the art. Such a vehicle attached flag must retain the benefits of a vehicle flag system by being relatively simple, easy to install and remove, and easily seen. Such a system must not leave a gap in a window of the vehicle, which gap can increase interior noise and can potentially allow moisture intrusion into the vehicle's interior. Such a flag system must not cause a depression in the seal strip of a vehicle's window and must not fall free of the vehicle when a user inadvertently opens the vehicle's window to which the flag is attached.

SUMMARY OF THE INVENTION

The vehicle mirror mounted flag of the present invention addresses the aforementioned needs in the art by providing a flag system that quickly and easily attaches to and detaches from a vehicle without causing any permanent or semi-permanent damage to the vehicle. The vehicle mirror mounted flag is not attached to any window of the vehicle so that the present invention does not create issues of an air gap in the window and does not result in flag loss should a window be inadvertently opened. The vehicle mirror mounted flag is of relatively simple design and construction, being produced using standard manufacturing techniques, so as to make the device relatively inexpensive and economically attractive to potential consumers for this type of device.

The vehicle mirror mounted flag of the present invention is comprised of an upper or first clip that has an upper hook portion that is used to attach the upper clip onto an upper edge of the housing of the mirror. A lower or second clip has a pair of coextensive slits and a lower hook portion that is used to attach the lower clip onto a lower edge of the housing of the mirror. A flag is attached to the upper clip and extends upwardly away from the housing of the mirror. A strap has a first end, a second end that has a first section of cooperating hook and loop material thereon, and a medial portion therebetween, the medial portion having a second section of cooperating hook and loop material thereon. The first end of the strap is attached to the upper clip and the second end of the strap is looped through the pair of slits of the lower clip in order to secure the strap to the lower clip. The second end of the strap, once looped through the slits, is removably attached to a medial portion of the strap by attaching the first portion of cooperating hook and loop material to the second portion of cooperating hook and loop material. The flag may be attached to the upper clip via a post which post may be removably attached to the upper clip

BRIEF DESCRIPTION OF THE DRAWINGS

Similar reference numerals refer to similar parts throughout the several views of the drawings.

DESCRIPTION OF THE PREFERRED EMBODIMENT

Figure 1:
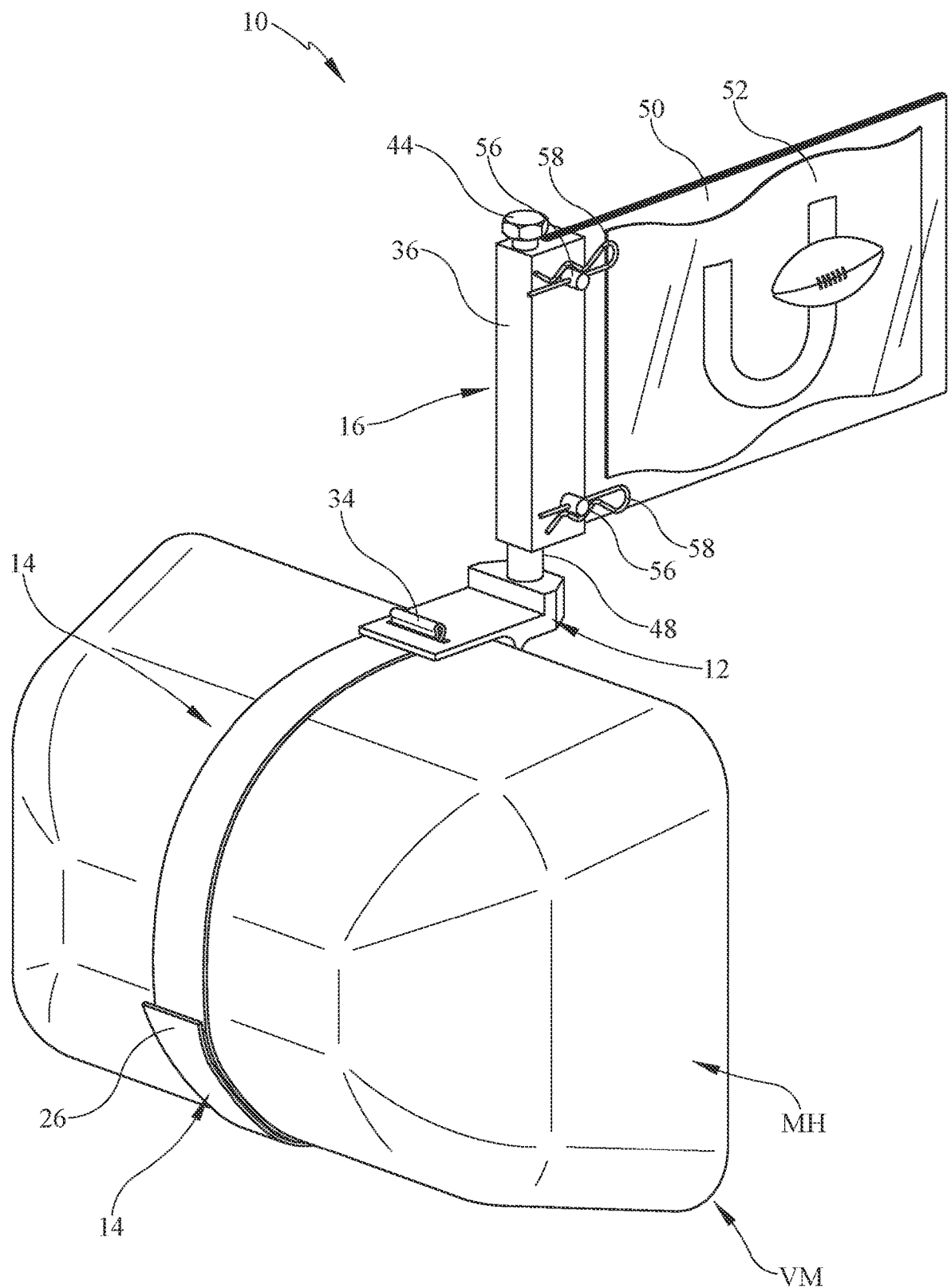
FIG. 1 is a rear perspective view of the vehicle mirror mounted flag of the present invention attached to a mirror.
Figure 2:
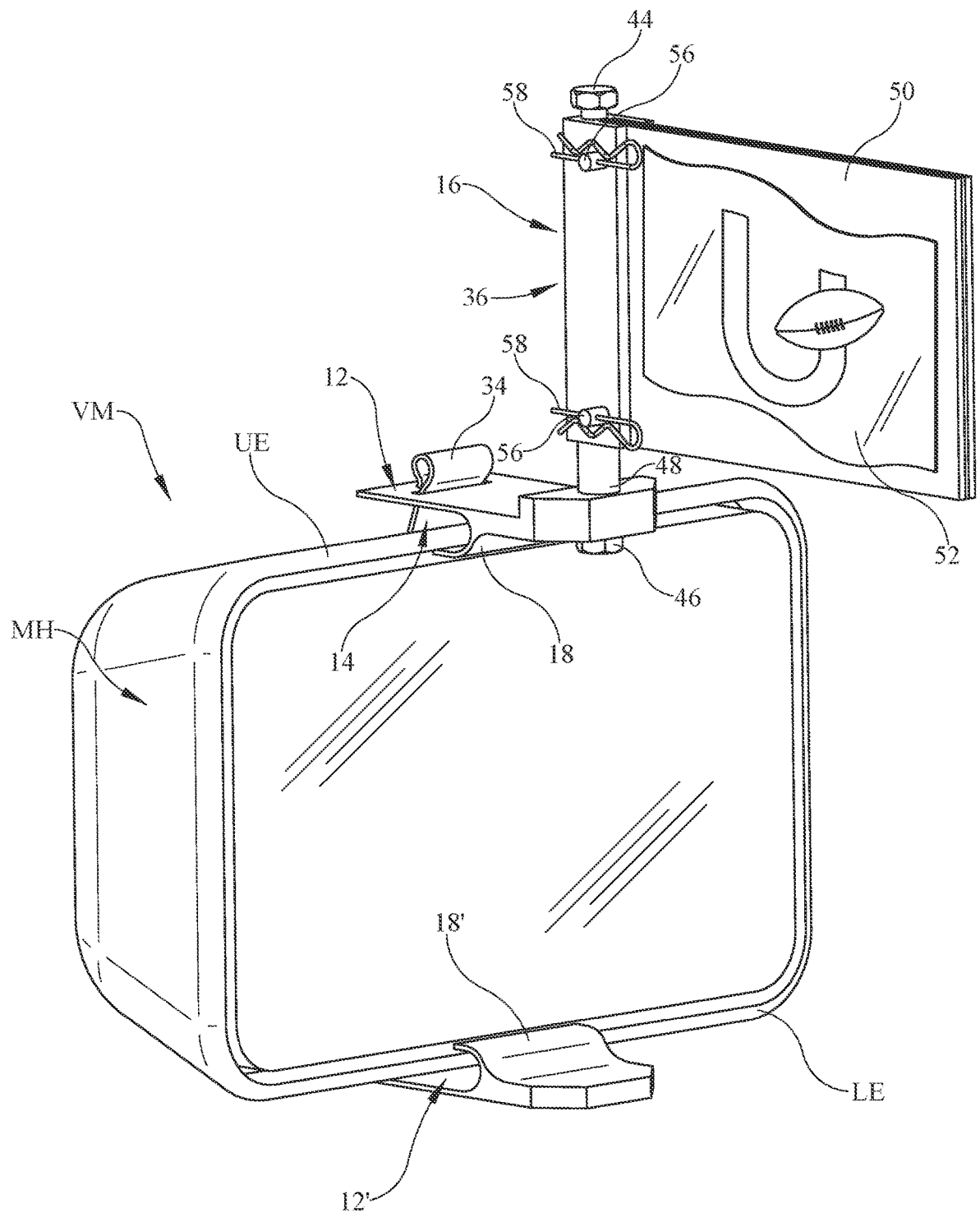
FIG. 2 is a front perspective view of the vehicle mirror mounted flag attached to the mirror.
Figure 3:
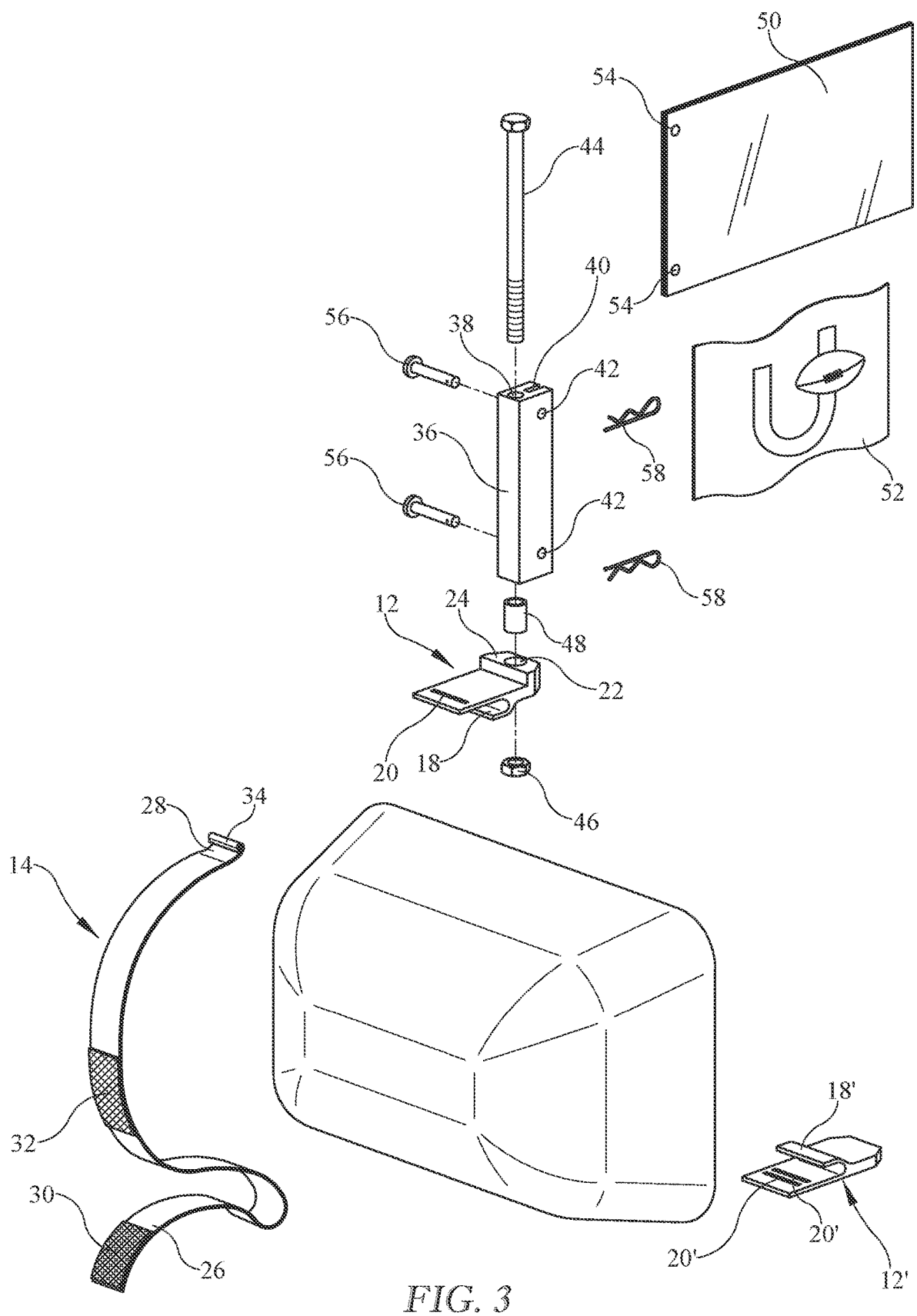
FIG. 3 is an exploded perspective view of the vehicle mirror mounted flag.
Figure 4:
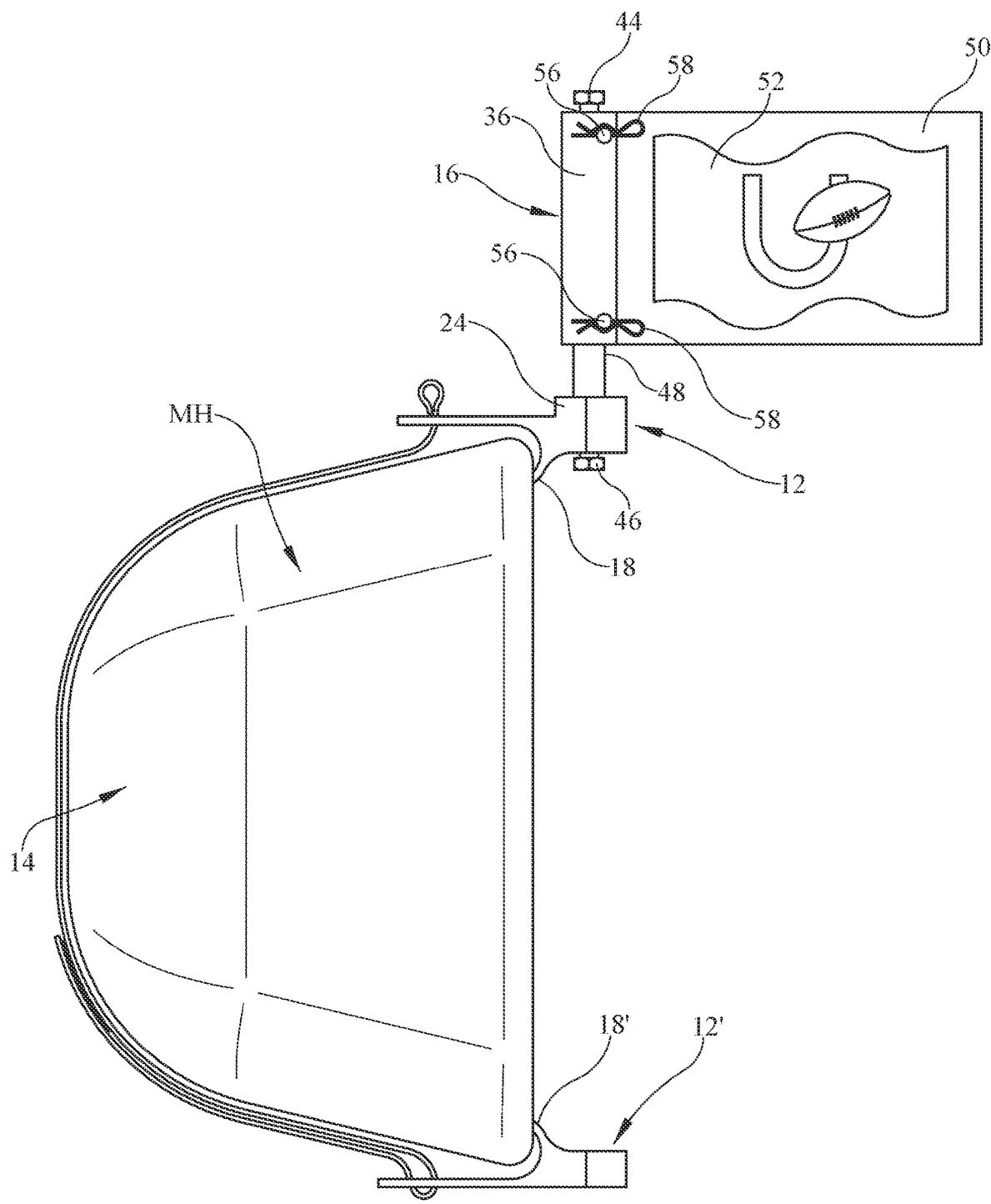
FIG. 4 is a side view of the vehicle mirror mounted flag attached to the mirror.

Referring now to the drawings, it is seen that the vehicle mirror mounted flag of the present invention, generally denoted by reference numeral 10, is comprised of an upper clip 12 and a lower clip 12', joined together by a length adjustable connecting strap 14, and a flag system 16 extending upwardly from the upper clip 12.

As seen, the upper clip 12 has an inner surface and an outer surface and has a generally U-shaped hook portion 18 extending downwardly. The upper clip 12 has at least one upper slit 20, and a clip opening 22, which may be located on a raised or reinforced portion 24 of the upper clip 12.

The lower clip 12' may be substantially similar to the upper clip 12 for ease of manufacturing, other than requiring two lower slits 20' or, as seen, may be slightly modified. In this modified version, the lower clip 12' also has an inner surface and an outer surface and a generally U-shaped hook portion 18' extending upwardly. As noted, the lower clip 12' has a pair of coextensive lower slits 20'.

Each clip 12 and 12' is made from a sturdy yet somewhat flexible material such as plastic and may have a non-scuff coating on at least the inner surface of each hook 12 and 12'.

The strap 14 has a first end 26 and an opposing second end 28. A first section of cooperating hook and loop material 30 is located at the first end 26 of the strap 14 while a corresponding second section of cooperating hook and loop material 32 is located medially long a length of the strap 14. As seen, the second end 28 of the strap 14 has a bulbous portion 34. The strap 14 is made from a strong and flexible material, such as nylon.

As seen, the flag system 16 comprises a post 36 that has a longitudinal opening 38 passing through the post 36 and a longitudinal slit 40 extending the length of the post 36, coextensive with the longitudinal opening 38. A pair of latitudinal openings 42 pass through the post 36 in spaced apart relationship to one another. The flag system 16 also comprises a lag bolt 44 and a corresponding nut 46 that fits onto the end of the lag bolt 44 as well as a spacer 48. A transparent protective sleeve 50 formed from a pair of plates holds a flag 52 (either soft or rigid) therebetween in sandwich fashion. The protective sleeve 50 has a pair of sleeve openings 54 located proximate one of its sides. The flag system 16 also comprises a pair of clevis pins 56 and corresponding cotters 58.

The flag system 16 is attached to the upper clip 12 by positioning the spacer 48 over the clip opening 22 and placing the post 36 atop the spacer 48 so that the longitudinal opening 38 of the post 36, the opening of the spacer 48 and the clip opening 22 all align. The lag bolt 44 is passed through these aligned openings and is secured in place via the nut 46. Thereafter, a desired flag 52 is sandwiched within the sleeve 50 and the sleeve 50 is slid into the slit 40 of the post 36 until the sleeve openings 54 align with the latitudinal openings 42 of the post 36. A clevis pin 56 is passed through each of the aligned openings 42 and 54 and is secured via a cotter 58. The sleeve 50 with the flag 52 is firmly sandwiched between the two plates of the sleeve 50 is now securely attached to the post 36, which itself is firmly attached to the upper clip 12. In lieu of the clevis and cotter arrangement, a simple bolt and nut, including a wing nut can be used to achieve the same result.

Thereafter, the bulbous portion 34 at the second end 28 of the strap 14 is pressed through the upper slit 20 of the upper clip 12. The strap 14 is sufficiently resilient so that the bulbous portion 34 deforms a sufficient amount to allow the bulbous portion 34 to be squeezed through the upper slit 20 of the upper clip 12. Once the bulbous portion 34 passes through the upper slit of the upper slit 12, the bulbous portion 34 resiliently expands so that the bulbous portion 34 cannot easily pass back through the upper slit 20 of the upper clip 12. Alternately, the second end of the strap can dispense with the use of the bulbous portion and can pass upwardly through one of the upper slits of the upper clip and then looped back down through a second upper slit (not illustrated) and the end of the strap attached to the remainder of the strap to form a loop with the coextensive upper slits. Other methods of attaching the second end of the strap to the upper clip can also be utilized.

The first end 26 of the strap 14 is passed down through one of the lower slits 20' of the lower clip 12' and then looped back up through the other lower slit 20' of this lower clip 12' thereby securing the strap 14 to the lower clip 12'.

The upper clip 12—the clip 12 holding the flag system 16—is hooked onto the upper edge UE of the vehicle's mirror housing MH via its hook portion 18 while the lower clip 12' is hooked onto the lower edge LE of the mirror housing MH via its hook portion 18' with the strap 14 passing along the outer surface OS of the mirror housing MH. The strap 14 is pulled taut until the two clips 12 and 12' re firmly held against their respective mirror edges UE and LE and the strap 14 is secured in this taut position by securing the strap 14 to itself via the sections of the cooperating hook and loop material 30 and 32—as noted above, both ends of the strap can be so secured. The vehicle mirror mounted flag 10 is now secured to the mirror VM and remains so even at highway speeds. The flag 52 bearing sleeve 50 is able to rotate with respect to the upper clip 12 about the lag bolt 44. To remove the vehicle mirror mounted flag 10, the strap 14 is merely detached from itself and loosened until the clips 12 and 12' can be unhooked from the mirror VM.

Of course, the flag system can be made in other architectures including having the post and the upper clip formed as a unitary piece. Additionally, the sleeve can be dispensed with and the flag can be attached directly to the post (in much the same way current vehicle flags are attached to their posts) via an appropriate adhesive, heat welding, etc. Further, in lieu of cooperating hook and loop material, the strap may have an appropriate sizing mechanism along its length or can be formed as two sections, one section each attached to a respective one clip with the two sections attached to one another via an appropriate buckle, the attachment buckle having sizing means thereon.

While the invention has been particularly shown and described with reference to an embodiment thereof, it will be appreciated by those skilled in the art that various changes in form and detail may be made without departing from the spirit and scope of the invention.

I claim:

1. A flag system attached to a mirror of a vehicle, the mirror having a housing with an upper edge, a lower edge and an outer body surface, the flag system comprising:
   an upper clip having an upper hook portion, the upper clip having a slit, the upper hook portion dimensioned and adapted to be hooked onto the upper edge of the housing of the mirror;
   a lower clip having a lower hook portion, the lower hook portion dimensioned and adapted to be hooked onto the lower edge of the housing of the mirror;
   a flag attached to the upper clip and extending upwardly away from the housing; and
   a strap having a first end attached to the lower clip and a second end having a resilient bulbous portion, the second end of the strap attached to the upper clip by passing the bulbous portion at the second end of the strap through the slit so that the bulbous portion rests on an upper surface of the upper clip and the strap passes through the slit, the strap passing along the outer body surface of the housing of the mirror and being pulled and held taut in order to secure the upper clip to the upper edge of the housing of the mirror and the lower clip to the lower edge of the housing of the mirror.

2. The flag system as claim 1 wherein the strap has hook and loop material in order to change the length of the strap between the upper clip and the lower clip.

3. The flag system as in claim 1 wherein the flag is attached to the upper clip via a post.

4. The flag system as in claim 3 wherein the post is removably attached to the upper clip.

5. The flag system as in claim 1 in combination with the mirror.

6. The flag system as claim 5 wherein the strap has hook and loop material in order to change the length of the strap between the upper clip and the lower clip.

7. The flag system as in claim 5 wherein the flag is attached to the upper clip via a post.

8. The flag system as in claim 7 wherein the post is removably attached to the upper clip.

9. A flag system attached to a mirror of a vehicle, the mirror having a housing with an upper edge, a lower edge and an outer body surface, the flag system comprising:
   an upper clip having an upper hook portion, the upper hook portion dimensioned and adapted to be hooked onto the upper edge of the housing of the mirror;
   a lower clip having a lower hook portion, the lower hook portion dimensioned and adapted to be hooked onto the lower edge of the housing of the mirror, the lower clip having a pair of coextensive lower slits;
   a flag attached to the upper clip and extending upwardly away from the housing; and
   a strap having a first end, a second end, and a medial portion therebetween, the second end of the strap attached to the upper clip and the first end of the strap looped through the pair of slits of the lower clip in order to secure the strap to the lower clip, the first end of the strap removably attached directly to a medial portion of the strap, the strap being pulled and held taut in order to secure the upper clip to the upper edge of the housing of the mirror and the lower clip to the lower edge of the housing of the mirror.

10. The flag system as in claim 9 wherein the flag is attached to the upper clip via a post.

11. The flag system as in claim 10 wherein the post is removably attached to the upper clip.

12. The flag system as in claim 9 in combination with the mirror.

13. The flag system as in claim 12 wherein the flag is attached to the upper clip via a post.

14. The flag system as in claim 13 wherein the post is removably attached to the upper clip.

* * * * *